United States Patent
Hawker et al.

(10) Patent No.: US 9,491,552 B2
(45) Date of Patent: Nov. 8, 2016

(54) ELECTRONIC DEVICE HAVING HEARING AID COMPATIBILITY

(71) Applicant: BlackBerry Limited, Waterloo (CA)

(72) Inventors: Larry Edward Hawker, Waterloo (CA); Christian Lorenz, Waterloo (CA)

(73) Assignee: BlackBerry Limited, Waterloo (CA)

( * ) Notice: Subject to any disclaimer, the term of this patent is extended or adjusted under 35 U.S.C. 154(b) by 47 days.

(21) Appl. No.: 14/075,236

(22) Filed: Nov. 8, 2013

(65) Prior Publication Data
US 2015/0131827 A1    May 14, 2015

(51) Int. Cl.
*H04R 25/00* (2006.01)
*H04M 1/725* (2006.01)

(52) U.S. Cl.
CPC ......... *H04R 25/00* (2013.01); *H04M 1/72591* (2013.01); *H04R 25/43* (2013.01); *H04R 25/554* (2013.01); *H04R 2430/00* (2013.01)

(58) Field of Classification Search
USPC .................................. 381/312, 98, 331, 311
See application file for complete search history.

(56) References Cited

U.S. PATENT DOCUMENTS

| | | | |
|---|---|---|---|
| 4,596,899 A * | 6/1986 | Wojcik | H04M 1/2155 379/52 |
| 5,557,673 A * | 9/1996 | Ginzburg | H04M 1/215 379/443 |
| 5,719,451 A | 2/1998 | Cook et al. | |
| 6,389,148 B1 * | 5/2002 | Yoo | H04R 11/02 381/417 |
| 6,658,126 B1 | 12/2003 | Stern | |
| 7,418,106 B2 | 8/2008 | Greuet et al. | |
| 8,014,821 B2 * | 9/2011 | Drader | H04M 1/72591 455/550.1 |
| 8,195,230 B2 | 6/2012 | Jung et al. | |
| 8,311,597 B2 | 11/2012 | Drader et al. | |
| 2006/0098826 A1 * | 5/2006 | Merline | H04R 27/00 381/92 |
| 2008/0267426 A1 * | 10/2008 | De Poortere | H04R 3/04 381/98 |
| 2010/0153845 A1 | 6/2010 | Gregorio et al. | |
| 2012/0155682 A1 | 6/2012 | Hawker et al. | |
| 2013/0052947 A1 | 2/2013 | Kole et al. | |
| 2014/0369170 A1 * | 12/2014 | Inha | H04M 1/7253 367/140 |

FOREIGN PATENT DOCUMENTS

EP    1903755 A2    3/2008

OTHER PUBLICATIONS

Website, "Linear Resonant Actuator (LRA) Vibration Motors :: Haptic Feedback", Precision Microdrives, at least as early as Nov. 2013, http://www.precisionmicrodrives.com/vibrating-vibrator-vibration-motors/linear-resonant-actuator-lra-haptic-vibration-motors.

(Continued)

*Primary Examiner* — Amir Etesam
(74) *Attorney, Agent, or Firm* — Ridout and Maybee LLP (57) ABSTRACT

An electronic device having hearing aid capability is disclosed. The electronic device includes a linear resonance actuator (LRA). The LRA is configured to produce both vibrations and a hearing aid compatible magnetic field. A processor coupled to the LRA is operable to control the LRA to generate a magnetic field for inductively coupling the electronic device to a hearing aid when a hearing aid compatibility (HAC) mode is enabled, wherein the generated magnetic field is encoded with audio information which corresponds to an audio signal.

17 Claims, 4 Drawing Sheets

(56) References Cited

OTHER PUBLICATIONS

Website, "Understanding Linear Resonant Actuator Characteristics", Precision Microdrives, at least as early as Nov. 2013, http://www.precisionmicrodrives.com/application-notes-technical-guides/application-bulletins/ab-020-understanding-linear-resonant-actuator-characteristics.

Website, "Driving Linear Resonance Vibration Actuators", Precision Microdrives, at least as early as Nov. 2013, http://www.precisionmicrodrives.com/application-notes-technical-guides/application-bulletins/ab-003-how-to-drive-linear-resonance-actuators-lra-vibrating-motors.

Website, "Understanding Eccentric Rotating Mass (ERM) Vibration Motor Characteristics", Precision Microdrives, at least as early as Nov. 2013, http://www.precisionmicrodrives.com/application-notes-technical-guides/application-bulletins/ab-004-understanding-erm-characteristics-for-vibration-applications.

Extended European Search Report; EP 14192254.2; Feb. 26, 2015.

\* cited by examiner

ELECTRONIC DEVICE HAVING HEARING AID COMPATIBILITY

TECHNICAL FIELD

The present disclosure relates to electronic devices, and in particular, to an electronic device having hearing aid compatibility.

BACKGROUND

Hearing aid compatibility (HAC) is generally directed to making devices such as telephones, which supply a conventional acoustic signal, compatible for use with devices that assist hearing, such as hearing aids. HAC involves generating a magnetic audio signal (which is inaudible) from or near the earpiece area of a mobile telephone. The magnetic audio signal is provided by a changing magnetic field which is encoded with audio information. The magnetic audio signal may be generated in addition to or instead of a conventional acoustic audio signal (which is audible). The magnetic audio signal is received by a receiving coil within the hearing aid. The receiving coil may be a telecoil (or T-coil). The hearing aid converts the magnetic audio signal received by the receiving coil into an acoustic signal. This acoustic signal, when emitted in the ear channel of a user, allows a hearing aid wearer to hear audio output from the telephone.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The concepts described herein are directed to electronic devices, such as cellular telephones or smart phones that are hearing aid compatible. Regulations for hearing aid compatible are set by various government agencies (which vary by jurisdiction), such as the Federal Communications Commission (FCC) in the United States of America. Hearing aid compatibility generally provides benefits for hearing aid users, such as less interference and acoustic feedback. Frequently, hearing aid compatibility provides an output that is more audible to a hearing aid wearer than an output that is audibly produced by the telephone earpiece and then processed by the hearing aid.

Within an electronic device such as a mobile telephone, the magnetic audio signal is typically generated by a receiver transducer and/or an inductor known as a HAC coil which is conventionally surface mounted to the printed circuit board (PCB) of the mobile telephone. HAC coils occupy space on the PCB and may affect the location of other components. The present disclosure provides a HAC electronic device which generates HAC signals without a HAC coil. Among potential benefits, the elimination of the HAC coil is believed to reduce the cost of manufacture, free up space on the PCB for other device components, and simplify device design/construction.

In accordance with one aspect of the present disclosure, there is provided a hearing aid compatible (HAC) electronic device. The electronic device comprises a linear resonance actuator (LRA); and a processor coupled to the LRA; wherein the processor is configured to control the LRA to generate a magnetic field for inductively coupling the electronic device to a hearing aid when a hearing aid compatibility (HAC) mode is enabled, wherein the generated magnetic field is encoded with audio information which corresponds to an audio signal.

In accordance with another aspect of the present disclosure, there is provided a method of controlling a linear resonance actuator (LRA), comprising: generating via a processor an audio signal; and sending the audio signal to the LRA when a hearing aid compatibility (HAC) mode is enabled, thereby producing a magnetic field encoded with audio information which corresponds to the audio signal, the magnetic field operable to inductively couple the LRA to a hearing aid.

Figure 1:
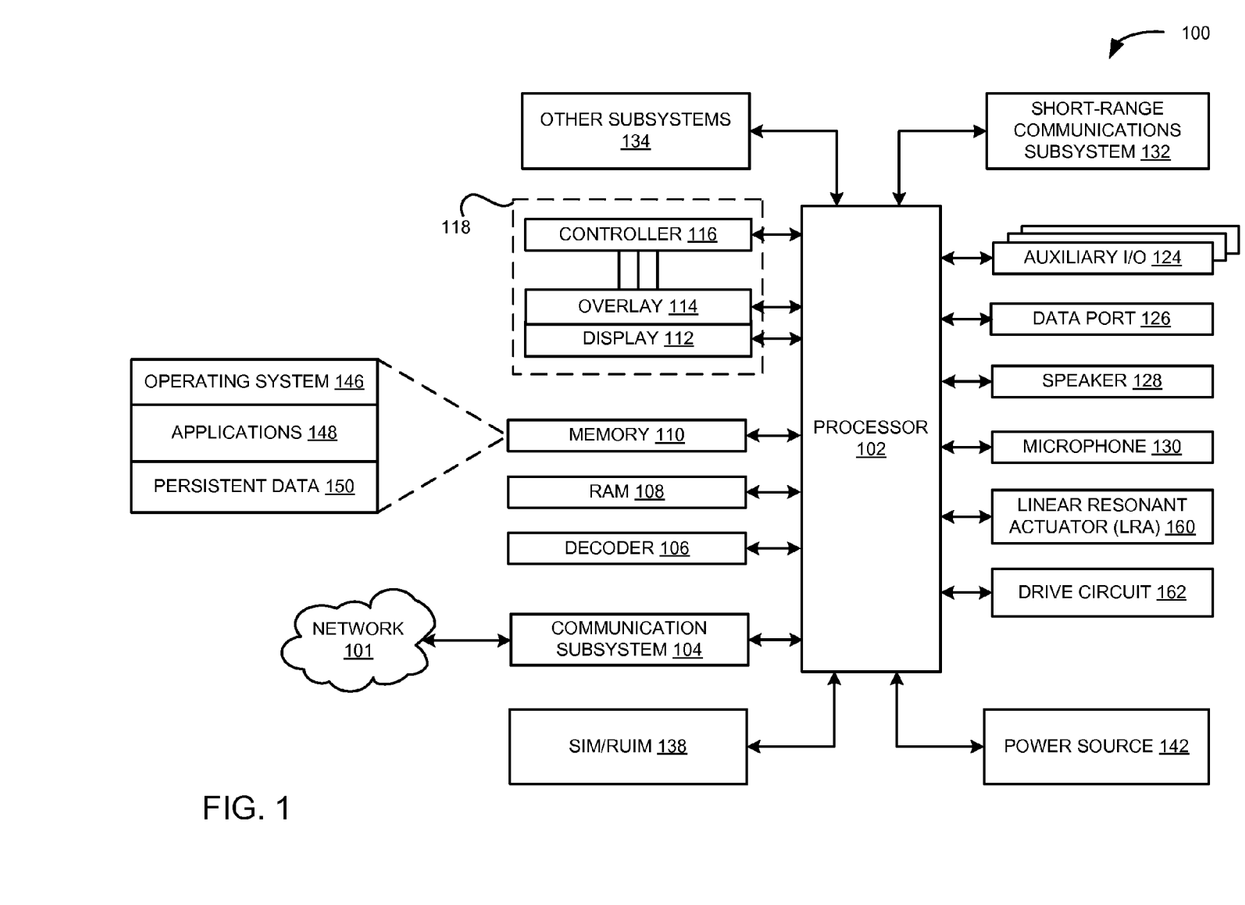
FIG. 1 is a block diagram of electronic components of an electronic device in accordance with one example embodiment of the present disclosure.

Reference is first made to FIG. 1 which shows in block diagram form an example embodiment of an electronic device 100. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 101. The wireless network 101 may be any type of wireless network, including, but not limited to, data wireless networks, voice wireless networks, and networks that support both voice and data communications. A power source 142, such as one or more rechargeable batteries or a port to an external power supply, powers the electronic device 100.

Example embodiments of the electronic device 100 include, but are not limited to, a mobile phone, smartphone or superphone, tablet computer, notebook computer (also known as a laptop, netbook or ultrabook computer depending on the device capabilities), wireless organizer, personal digital assistant (PDA), mobile gaming device, special purpose digital camera or wearable computer such as a smartwatch or optical head-mounted display (OHMD) such as Google Glass™ from Google Inc.

The processor 102 interacts with other components, such as Random Access Memory (RAM) 108, memory 110, a display 112 (such as a liquid crystal display (LCD)) with a touch-sensitive overlay 114 operably coupled to an electronic controller 116 that together comprise a touch-sensitive display 118, one or more auxiliary input/output (I/O) subsystems 124, a data port 126, a speaker (also known as a receiver transducer) 128, a microphone 130, short-range communications subsystem 132, other device subsystems 134, a linear resonant actuator (LRA) 160 and an drive circuit 162 for driving the LRA 160 and possibly the speaker 128. User-interaction with a graphical user interface (GUI) is performed through the touch-sensitive overlay 114. The processor 102 interacts with the touch-sensitive overlay 114 via the electronic controller 116. Information, such as text, characters, symbols, images, icons, and other items that may be displayed or rendered on an electronic device 100, is displayed on the touch-sensitive display 118 via the processor 102.

To identify a subscriber for network access, the electronic device 100 uses a Subscriber Identity Module or a Removable User Identity Module (SIM/RUIM) card 138 for communication with a network, such as the wireless network 101. Alternatively, user identification information may be programmed into memory 110.

The electronic device 100 includes an operating system 146 and software applications or programs 148 that are executed by the processor 102 and are typically stored in a persistent, updatable store such as the memory 110. Additional applications or programs 148 may be loaded onto the electronic device 100 through the wireless network 101, the auxiliary I/O subsystem 124, the data port 126, the short-range communications subsystem 132 or any other suitable subsystem 134. Additionally, persistent data 150, such as user-preferences and multimedia files, may be stored in the memory 110.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example embodiment e-mail messages, which may be transmitted over the wireless network 101 through the communication subsystem 104. For voice communications, the overall operation of the electronic device 100 is similar. The speaker 128 outputs audible information converted from electrical signals, and the microphone 130 converts audible information into electrical signals for processing.

Figure 2:
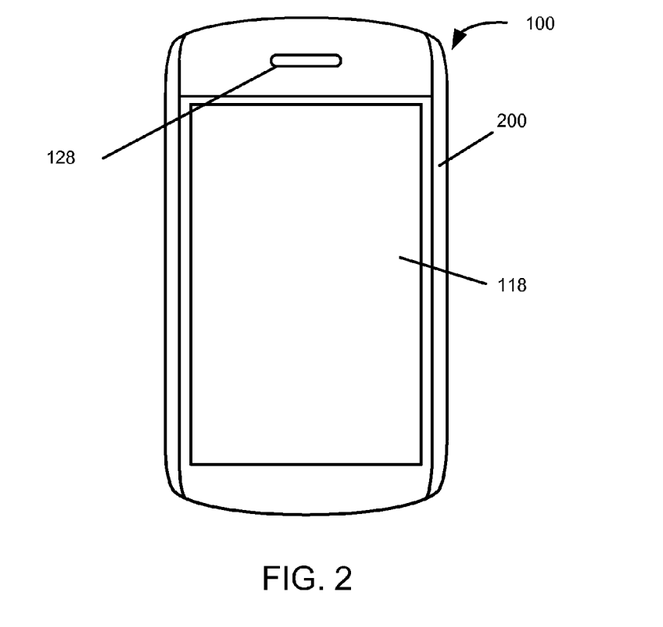
FIG. 2 is a front view of an example embodiment of an electronic device in a portrait orientation.

Reference is now made to FIG. 2 which shows a front view of an example embodiment of an electronic device 100 in portrait orientation. The electronic device 100 includes a rigid housing 200 that houses internal components including internal components shown in FIG. 1 and frames the touch-sensitive display 118 such that the touch-sensitive display 118 is exposed for user-interaction therewith when the electronic device 100 is in use. It will be appreciated that the touch-sensitive display 118 may include any suitable number of user-selectable features rendered thereon, for example, in the form of virtual buttons for user-selection of, for example, applications, options, or keys of a keyboard for user entry of data during operation of the electronic device 100. While the shown electronic device 100 is a "bar" or "brick" style device, the present disclosure is intended to capture all types of form factors including, but not limited to, slider-style and flip-style devices.

The auxiliary I/O subsystems 124 could include other input devices such as one or more control keys, a keyboard or keypad, navigation device, or any combination thereof. The navigation device may be a depressible/clickable trackball, a depressible/clickable scroll wheel, a touch-sensitive optical track pad, or a touch-sensitive touchpad.

In other embodiments, a conventional display such as an LCD may be provided instead of the touch-sensitive display 118. In such embodiments, input may be provided via one or more control keys, a keyboard or keypad, navigation device, or any combination thereof.

The speaker 128, in some embodiments, is electrically coupled to the processor 102. As used herein, components are not electrically coupled if they convey electric signals to one another wirelessly without physical conductors, such as by induction. The speaker 128 includes an electric-to-acoustic transducer (not shown) which converts electric audio signals received from the processor 102 into acoustic audio signals (i.e., an audible audio output). The acoustic audio signals generated by the speaker 128 are transmitted through an opening in the housing 200 of the electronic device 100 to the outside environment using, for example, a speaker boot or acoustic port. The speaker 128 may include a shield can (or casing) that may be used to enhance the frequency response of the acoustic system and decrease the distortion caused by magnetic fields being received or transmitted from electrical components. The frequency response of the acoustic system is typically tuned to correspond with the typical hearing range of humans, i.e. 20 Hz to 20,000 Hz.

The speaker 128 may be a conventional speaker which includes a diaphragm connected to a rigid frame via a flexible suspension that constrains a voice coil adapted to move axially through a magnetic gap of suitable shape. When an electric audio signal is applied to the voice coil, a magnetic field is generated by the electric current in the voice coil. The magnetic field generated by the voice coil interacts with the cylindrical magnetic gap, causing the voice coil and diaphragm to move back and forth. The movement of the diaphragm causes the acoustic or audible audio signal, thereby reproducing audio corresponding to the electric audio signal.

The speaker 128 may be configured to provide different levels of audible audio signals for private audible audio signals (i.e., low volume), non-private audible audio signals (i.e., high volume) for using the electronic device 100 as speakerphone, or both. The auxiliary I/O subsystems 124 may include an audio output port configured to be coupled to an external speaker or headset for use instead of, or in addition, to the speaker 128.

The LRA 160 is electrically coupled to the processor 102. The LRA 160 generally converts signals from the processor 102 into vibrations, for example as a form of user notification, and magnetic fields for generating a HAC magnetic audio signal. Thus, as explained in greater detail below, the LRA 160 is used to provide both vibration and HAC functions of the electronic device 100.

The LRA 160 operates under direct or indirect control of the processor 102 and includes a movable mass, a permanent magnet, a voice coil, and a spring (none of which are shown). In some embodiments, the permanent magnet is also the movable mass. Because the permanent magnet is usually the heaviest part of the LRA 160, the permanent magnet can be used as the movable mass thereby obviating the need to include an additional mass. The voice coil of the LRA 160 receives a signal from the processor 102 (or from another source, for example, from the drive circuit 162 under control of the processor 102), and in response produces a HAC magnetic field in correspondence with the audio signal from the processor 102. The magnetic field produced typically has a wide frequency range and can therefore be used for inductive coupling of the electronic device 100 to a hearing aid (such as hearing aid 300, shown in FIG. 3).

The HAC magnetic field produced by the LRA 160 also interacts with the permanent magnet of the LRA 160, causing the permanent magnet to move in correspondence with the signal from the processor 102. The movement of the permanent magnet can be used in some modes to cause the LRA 160 to vibrate. The LRA 160 typically has a relatively narrow vibration frequency range, centered at a resonant frequency. The mass will move significantly only within this frequency range. Since the LRA 160 only vibrates within a narrow frequency range, this frequency range is referred to in the present disclosure as the vibration frequency range. The vibration frequency range, in some embodiments, has a bandwidth of about 20 to about 50 Hz, centered at a frequency in range of about 100 to about 300 Hz. When the LRA 160 receives a signal from the processor 102 having a frequency component within this vibration frequency range, the LRA 160 will vibrate. When the signal from the processor 102 does not have a frequency component within this vibration frequency range, the LRA 160 does not vibrate (negligible vibrations may occur), and instead only generates a magnetic audio signal in correspondence with the signal received from the processor 102. The magnetic audio signals generated by LRA 160 are transmitted through the housing 200 of the electronic device 100 to the outside environment.

Additionally, the movement of the permanent magnet due to the HAC magnetic field causes an additional magnetic field to be generated. The additional magnetic field typically has a narrow frequency range and is centered at the resonant frequency of the LRA 160. The additional magnetic field interacts with the HAC magnetic field and causes distortion of the HAC magnetic field. Accordingly, when inductively coupling the electronic device 100 to a hearing aid, the additional magnetic field produced by the LRA 160 is undesired. Any vibration is also generally undesired. As will be explained in greater detail below, the LRA 160 is used to provide both vibration and HAC functions of the electronic device 100 by minimizing the vibrations and the additional magnetic field caused by the movement of the permanent magnet.

It will be appreciated that the magnetic field generated by the LRA 160 is due to (i) the current through the voice coil of the LRA 160 and (ii) the motion of the permanent magnet of the LRA 160. The magnetic field generated by the current through the voice coil of the LRA 160 is the desired broadband magnetic audio signal for generating the HAC magnetic audio signal—it goes from DC (i.e., frequency of 0 Hz) to an upper limit determined by a roll-off due (similar to a first-order low-pass filter) to the voice coil inductance. The magnetic field generated by the motion of the permanent magnet is very narrowband and is centered about the LRA resonance frequency due to the limited motion away from this frequency. When the permanent magnet is also the moving mass, the effect of the magnetic field due to the permanent magnet, when it combines with the magnetic field due to the current in the voice coil, is to create an undesired peak and dip (or dip and peak) near the resonance frequency. The peak/dip (or dip/peak) depends on the orientation of the magnetic field in the permanent magnet and the direction of the voice coil winding since these two parameters determine the direction of motion of the permanent magnet when a drive signal is applied. Thus, there are two reasons to filter the audio signal around the LRA resonance frequency: (1) to remove the unwanted vibration when only magnetic output is desired; and (2) to remove the magnetic peak/dip which could cause the magnetic frequency response to fall outside of the desired frequency range, such as the minimum frequency range set by the FCC.

The drive circuit 162, in some example embodiments, is configured to drive both the LRA 160 and the speaker 128. The LRA 160 is driven to generate a HAC magnetic audio signal when a HAC mode is enabled, and is driven to produce vibrations for user notifications are desired. The particular type(s) of user notifications for which the LRA 160 is vibrated would be understood to the skilled person and may vary between embodiments. The particular type(s) of user notifications may be a user configurable setting or parameter. Without limiting the nature of the user notifications with which the LRA 160 may be used, it is contemplated that the LRA 160 may be vibrated to generate a user notification when a call is received, when new data such as a new electronic message (e.g., email, instant message, PIN message, text message), picture, song or other data item is received, a reminder when a calendar event (e.g., meeting) occurs or is approaching, or other device event (e.g., low battery, loss of connection with the wireless network 101, etc.). The speaker 128 is driven to generate an audible audio output signals and possibly magnetic audio output signals if capable. The drive circuit 162 may be configured to drive the LRA 162 and speaker 128 in parallel or in series. In other embodiments, the drive circuit 162 may be configured to drive the LRA 162 and another drive circuit is provided for driving the speaker 128.

Figure 3:
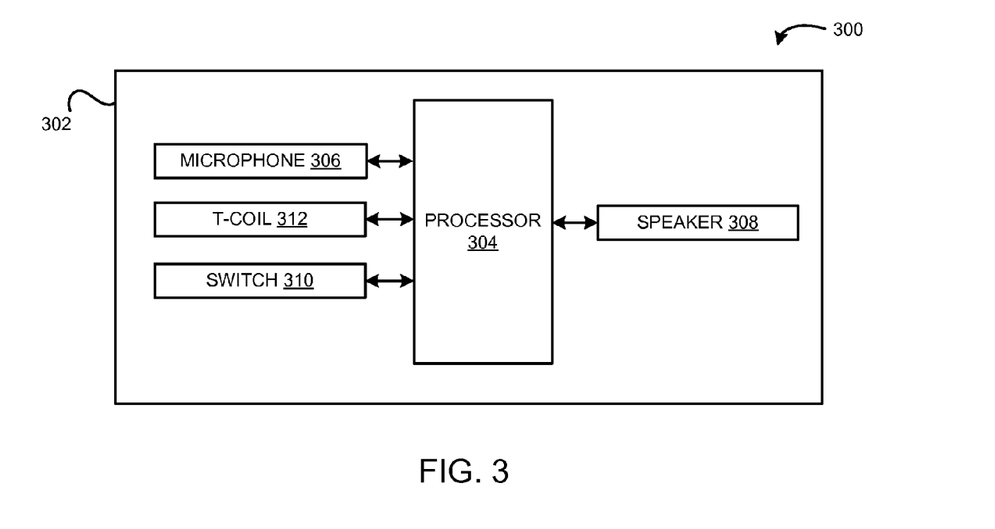
FIG. 3 is a block diagram of electronic components of an example embodiment hearing aid suitable for use with the electronic device of the present disclosure.

In one embodiment, the LRA 162 and speaker 128 are driven by the drive circuit 162 at substantially the same time such that the magnetic field generated by the speaker 128 and the magnetic field generated by the LRA 162 are both received by a hearing aid, such as the hearing aid 300 (FIG. 3).

The drive circuit 162 receives a signal (or instruction) from the processor 102 and generates an alternating current (AC) drive signal corresponding to the signal received. The signal may be generated in response to the operating systems 146 or application 148 executing audio instructions 410 or vibration instructions 412. Without limitation, the audio instructions 410 may be executed by a phone application, media player application or other audio application which is configured to generate audio from one or more audio source(s) 402 which may be local (e.g., stored locally in onboard memory), remote (e.g., streamed) or a combination thereof. Without limitation, the vibration instructions 412 could be executed by a phone application, a social media application such as Google+™, Facebook™ or LinkedIN™, a dedicated messaging application, a calendar application, a personal information manager application (PIM) application, a photo sharing application such as Instagram™ or a digital picture viewing application, a media player application or other application which is configured to generate user notifications. The applications could be dedicated local applications performed on persistent data 150 stored in memory 144, Web-based or other client-server based applications with at some data and/or logic performed remotely, or a Web page accessed via an Internet Browser.

The drive circuit 162 may also include an amplifier to amplify the amplitude AC drive signal. When the amplitude of the AC drive signal is increased, the magnetic field and vibrations produced by the LRA 160, and the audible audio output produced by the speaker 128 are all amplified. Additionally, the AC drive signal may be produced such that the impedance of the signal matches the input impedance of the LRA 160 and/or the speaker 128. Thus, the output impedance of the drive circuit 162 may be matched with the input impedance of the LRA 160 and/or the speaker 128, thereby minimizing losses due to the transmission of the AC drive signal. In some embodiments, the LRA 160 and speaker 128 may be selected to have identical (within a given tolerance range) or similar input impedance to allow both components to be driven efficiently by the same drive circuit 162.

Reference is now made to FIG. 3, which shows in block diagram form an example embodiment hearing aid 300 that may be used with the electronic device 100. The hearing aid 300 includes a housing 302, a hearing aid processor 304 carried by the housing 302, and an input transducer such as a microphone 306 connected to the hearing aid processor 304. When in an audio operation mode (i.e., when not used with a HAC compliant wireless device such as the electronic device 100 phone), audio input received by the microphone 306 is processed and output by the hearing aid processor 304 to an output transducer, such as a speaker 308 for a hearing aid user's ear. The hearing aid 300 in some embodiments also includes a magnetic switch 310 (e.g., a reed switch) and a T-coil 312 to provide capabilities for receiving input from a HAC compliant wireless device. More particularly, the switch 310 is actuated upon being placed in close proximity to a magnetic field generated by a HAC compliant wireless device such as the electronic device 100, which causes the hearing aid processor 304 to switch from the microphone 306 to the T-coil 312 as the input source.

When a hearing aid 300 is placed near the electronic device 100, for example when a user has the hearing aid 300 placed in his or her ear and the electronic device 100 is held close to his or her ear in normal use, a T-coil in the hearing aid 300 receives or picks up (via principles of electromagnetic induction) the HAC magnetic field generated by the LRA 160. The T-coil in the hearing aid 300 then converts the magnetic field into an electric audio signal. An electric-to-acoustic transducer (i.e., a small speaker) converts the electric audio signals into acoustic audio signals. The hearing aid 300 amplifies or otherwise processes the received audio signals to make the audio audible to the user wearing the hearing aid 300.

The LRA 160 may be positioned proximate to the location of the speaker 128. In the shown example embodiment (FIG. 2), the speaker 128 is located in the center of an upper portion of the housing 200. In some example embodiments, the LRA 160 is aligned with the center of the speaker 128 and located proximate (e.g., adjacent) to the speaker 128. This allows the magnetic field generated by the LRA 160 to more readily combine with any magnetic field generated by the speaker 128.

In other example embodiments, the LRA 160 is positioned centrally below the speaker 128. Positioning the LRA 160 centrally below the speaker 128 may reduce left/right bias. Left bias occurs when the magnetic field generated is stronger on the left of the LRA 160, and right bias occurs when the magnetic field generated is stronger on the right side of the LRA 160. The varying strength of the magnetic field may be due to elements of the LRA 160 being in uneven proximity to the speaker 128. By placing the LRA 160 centrally below the speaker 128, the possibility for notable left/right bias is reduced. The magnetic field generated by the LRA 160 will be more uniform in strength (i.e., magnitude) since it is located centrally below the speaker 128. This provides a magnetic field with more uniform magnitude.

In yet other example embodiments, the LRA 160 may not be aligned with respect to the speaker 128 (for example, if the speaker is offset due to space limitations). Such embodiments, while operable, may tend to increase left/right bias for the reasons described above. However, this left/right bias may serve to locate the peak magnitude signal away from sources of magnetic noise within the electronic device 100, thereby increasing the magnetic audio signal-to-noise ratio and allowing for a more optimal positioning of the electronic device 100 with respect to the user's ear. In spite of these considerations, such variations on placement of the LRA 160 may be useful in some implementations, and may be (for example) more useful than having no HAC system at all.

The central location of the speaker 128 and LRA 160 may provide some users with more freedom in regards to where the electronic device 100 is held during use. During normal use, for example during a voice call, the electronic device 100 is placed near the hearing aid 300 containing the T-coil 312 (e.g., in or near the user's ear). However, the size, shape and wearing location of hearing aid devices vary and the location of the T-coil inside hearing aid devices vary. The speaker 128 and LRA 160 may be located somewhere other than the center of housing 200 in other embodiments.

Figure 4:
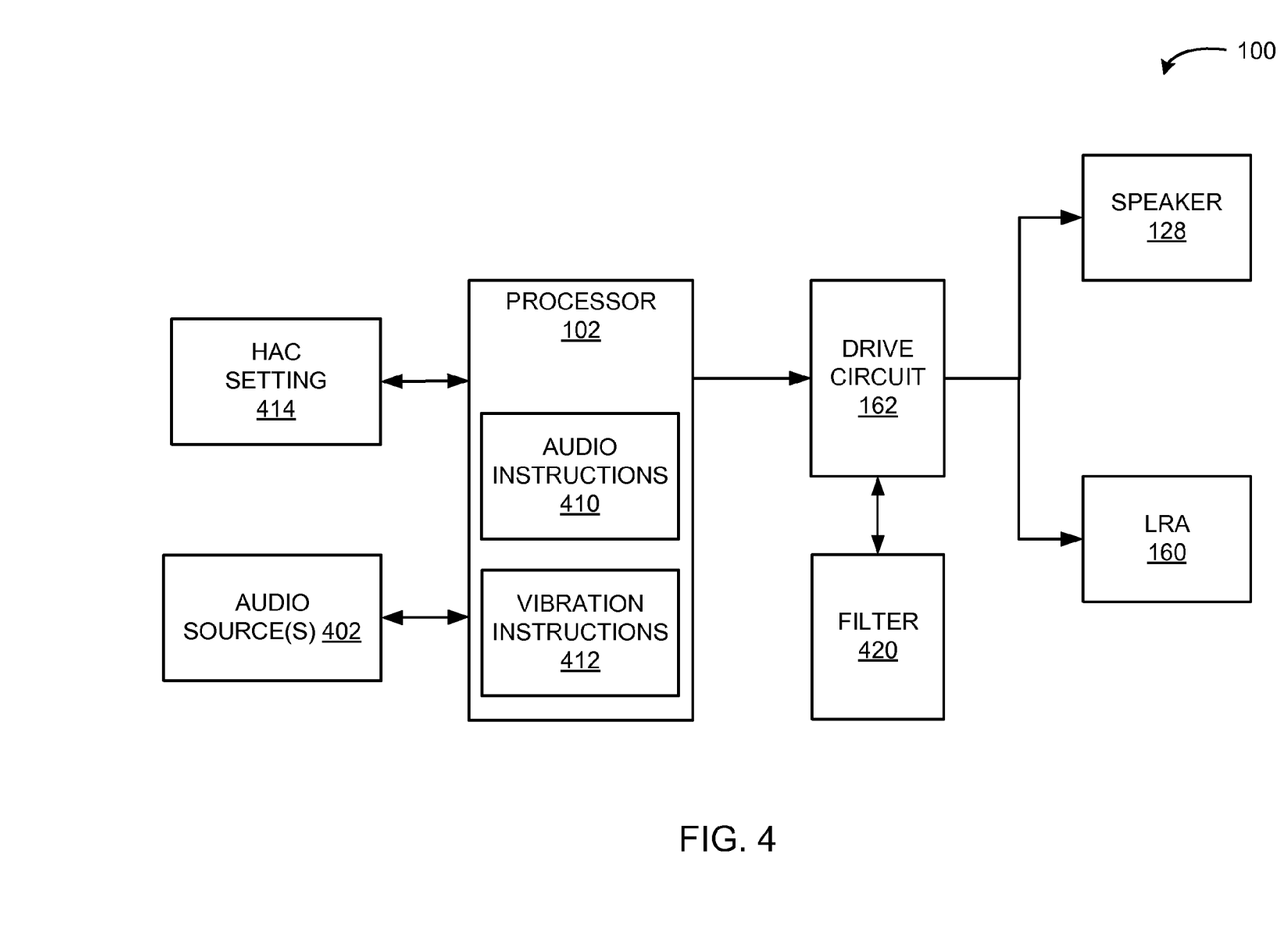
FIG. 4 is a diagram of select electronic components of the electronic device in accordance with one example embodiment of the present disclosure.

Reference is now made to FIG. 4 which shows in block diagram form an example embodiment functional circuit diagram of the hearing-aid compatible electronic device 100 according to one embodiment of the disclosure.

The electronic device 100 includes the processor 102, the drive circuit 162, the speaker 128, and the LRA 160, all previously shown in FIG. 1. The processor 102 of the device 100 is executing programmable code stored in memory 110 which allows the processor 102 to control the behavior of the drive circuit 162, the speaker 128 and the LRA 160 (amongst other things), either directly or indirectly (i.e., via another component). The processor 102 in the example embodiment shown executes audio instructions 410, for example from an active application 148 such as a phone application or media player application, to generate an audio signal from one or more audio source(s) 402. The processor 102 in the example embodiment shown also executes vibration instructions 412, for example from an active application 148 such as a phone application, messaging application or social media application, to generate a vibration signal for driving the LRA 160 to produce vibrations in a vibration frequency range typically as a form of user notification, as will be discussed in more detail.

The processor 102 also retrieves from memory 110 or receives via a user input (such as, but not limited to the touch-sensitive display 118) a HAC setting 414 which determines whether an HAC mode is enabled or disabled, and controls the processing and output of the audio signal. In at least some example embodiments, the HAC setting 414 may be toggled between "on" and "off" values to enable or disable the HAC mode. The HAC setting 414 may be a default factory setting. In other example embodiments, the HAC setting 414 could be a fixed factory setting. When the HAC mode is enabled, the steps set out in the audio instructions 410 cause the processor 102 to generate an audio signal suitable for generating a HAC magnetic field for inductively coupling the electronic device 100 to a hearing aid (such as the hearing aid 300). When the HAC mode is enabled, the processor 102 may also control other components of the device 100 to help produce the HAC magnetic field. When the HAC mode is disabled, the steps set out in the audio instructions 410 cause the processor 102 to generate an audible audio output via the speaker 128. In some embodiments, when the HAC mode is enabled, both the HAC magnetic field and the audible audio output are generated. This allows the electronic device 100 to be used by non-hearing aid users, for example, in case of a medical emergency.

The processor 102 is coupled to one or more audio sources 402, and generates the audio signal in correspondence with the audio provided from one of the audio sources 402. The audio sources 402 include, without limitation, multimedia files, such as video and audio files, stored in memory 110 and real-time media received via communication subsystem 104, such as phone calls and media streaming. The processor 102 uses the audio from the audio source(s) 402 to generate an audio signal, and selects and controls (directly or indirectly) the LRA 160 to generate the HAC magnetic field and/or the speaker 128 to generate an audible audio output, in correspondence with audio source.

The drive circuit 162 is coupled to the processor 102, the speaker 128 and the LRA 160 in the shown example embodiment. Thus, the processor 102 controls the speaker 128 and the LRA 160 via the drive circuit 162. In other embodiments, the speaker 128 and the LRA 160 are each coupled to different drive circuits.

The electronic device 100 also includes a filter 420 coupled, directly or indirectly, to the drive circuit 162 and the processor 102. The filter 420 is suited to receive and filter the audio signal generated by the processor 102, the AC drive signal generated by the drive circuit 162, or both depending on the embodiment. The output of the filter 420 is a filtered signal, having an attenuated frequency component. The filter 420 may be, without limitation, a hardware or software based digital signal processing (DSP) filter. Additionally, in some embodiments, the processor 102 performs the filtering functionality of the filter 420, for exampling by executing a Fast Fourier transform (FFT) algorithm. In such embodiments, a separate filtering component may not be required.

The filter 420 is typically a high-pass filter; however, other types of filters may be employed. The filter 420, when enabled, is tuned to filter out (i.e. attenuate) the frequency component of the vibration frequency range of the LRA 160. As previously discussed, the vibration frequency range usually has a narrow bandwidth centered at about 100 to about 300 Hz. Thus, the use of a high-pass filter to filter any frequency component below about 100 to about 300 Hz is generally acceptable. In some embodiments, any frequency component below about 300 Hz is filtered out while frequencies above about 300 Hz are passed and maintained in the resultant magnetic audio signal for compliance with HAC regulations. However, the filter 420 may be tuned to match the center of the vibration frequency range of the LRA 160. The filtered signal generated thus lacks the lower frequencies and generally may have a frequency range extending from the upper limit of the vibration frequency range (i.e., about 100 to about 300 Hz) to the upper limit of human hearing range (i.e., about 20,000 Hz). Thus, when the filtered audio signal is used to drive the LRA 160, the LRA 160 does not vibrate significantly. Additionally, since the vibrations are significantly minimized, the permanent magnet does not move and, therefore the undesired additional magnetic field is not generated. Instead, the LRA 160 generates a HAC magnetic field in correspondence with the filtered audio signal (thus, also in correspondence with the audio signal generated by the processor 102). The HAC magnetic field produced is suitable for inductively coupling the LRA 160 (and the electronic device 100) to a hearing aid (such as hearing aid 300).

However, it is noted that the magnetic field produced, when processed by the hearing aid, will lack the lower frequencies (i.e., less than about 100-300 Hz) of the audio signal and generally may have the same frequency range as the filtered audio signal (i.e., about 100-300 to about 20,000 Hz). Since the lower frequencies are not required for compliance with HAC specifications, this processing is considered to be a good compromise because using the LRA 160 for both vibration functions and HAC functions provides efficiency in cost and space in the design and manufacture of the device 100. It is noted that frequencies lower than the vibration frequency range (i.e., lower than about 100-300 Hz) are still audible and can improve audio quality. Thus, in other embodiments the vibration frequency range can be filtered out while permitting frequencies lower than the vibration frequency range are passed and maintained in the resultant magnetic audio signal.

In the electronic device 100, the processor 102, upon executing audio instructions 410 generates an audio signal based on the audio source 402. The processor 102 then sends the generated audio signal to the drive circuit 162. The drive circuit 162, operating under control of the processor 102, receives the audio signal from the processor 102 and generates the AC drive signal to drive the speaker 128 to produce an audible audio output and/or the LRA 160 to produce a HAC magnetic field for inductively coupling the electronic device 100 to a hearing aid (such as hearing aid 300).

The drive circuit 162 may drive and enable only one or both of the speaker 128 and the LRA 160, based on instructions received from the processor 102. The speaker 128 may be disabled when the HAC setting 414 indicates the HAC mode is enabled. This may reduce power consumption in the electronic device 100. However, if the speaker 128 also generates a magnetic field suitable for use by a hearing aid, such as the hearing aid 300, then the speaker 128 may remain enabled. When the HAC mode is disabled, it is desirable to disable the LRA 160, to reduce power consumption of the electronic device 100. To perform the selection function, the drive circuit 162 may include a hardware or a software based multiplexor, or may include controls to enable and/or disable the required components. Alternately, the processor 102 may perform the selection function directly.

In the electronic device 100, the processor 102, upon executing vibration instructions 412 generates a vibration signal based on instructions from the processor 102. The processor 102 then sends the generated vibration signal to the drive circuit 162. The drive circuit 162, operating under control of the processor 102, receives the vibration signal from the processor 102 and generates the AC drive signal to drive the LRA 160 to vibrate.

Figure 5:
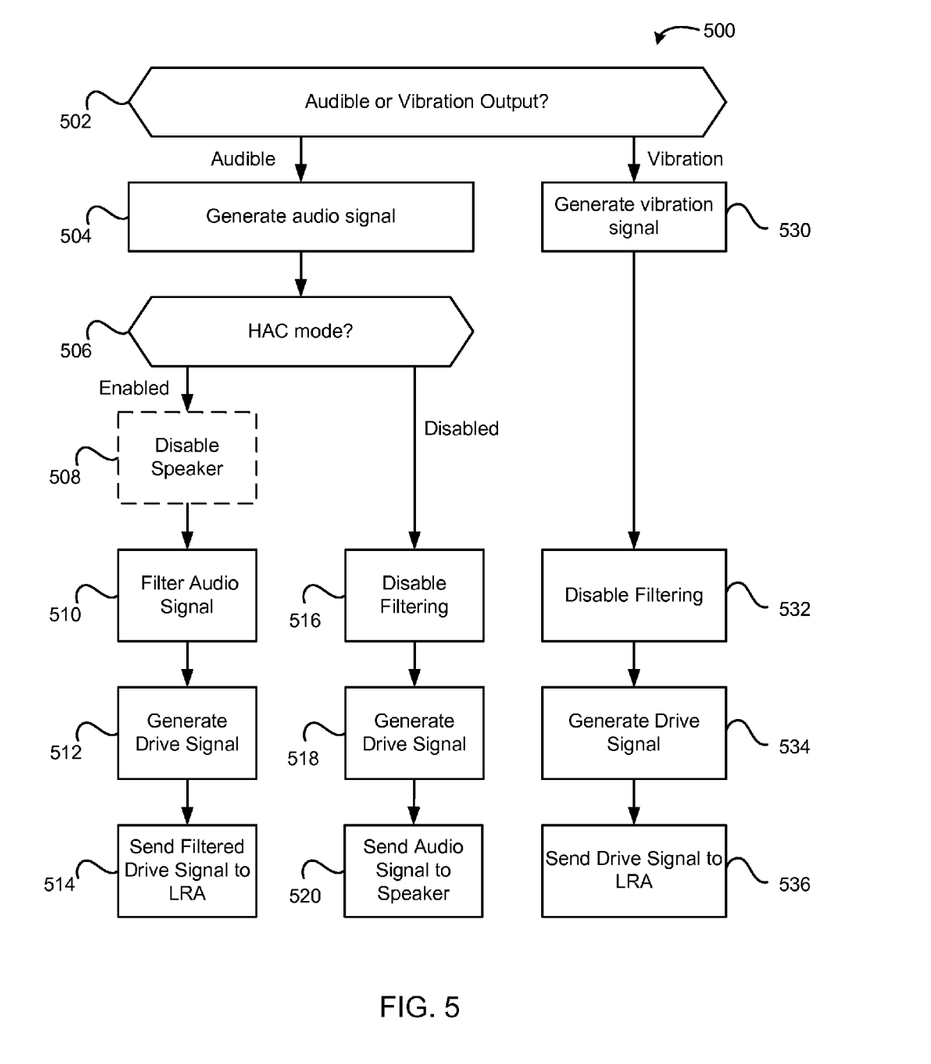
FIG. 5 is a flowchart illustrating a method for use with the electronic device in accordance with one example embodiment of the present disclosure.

Reference is now made to FIG. 5 which shows a flowchart of a method 500 for controlling the output of an audio signal generated by the processor 102 of the electronic device 100. The method 500 may be carried out by software executed, for example, by a processor. Coding of software for carrying out such a method 500 is within the scope of a person of ordinary skill in the art provided the present disclosure. The method 500 may contain additional or fewer processes than shown and/or described, and may be performed in a different order. Computer-readable code executable by the processor 102 to perform the method 500 may be stored in a computer-readable medium such as a memory 110 of a host device.

The processor 102 of the electronic device 100 determines, at 502, whether an audible audio output or a vibration output is to be generated. For example, if audio instructions 410 have generated an audio signal, then it is determined that an audible audio output is to be generated. Similarly, if the vibration instructions 412 have generated a vibration signal, then it is determined that a vibration output is to be generated. However, additional settings stored in memory 110 may help reconcile the user's preference as to whether to generate vibrations when an audible audio output is being produced. Generating both outputs simultaneously may be useful in some circumstance, such as to notify the user of the receipt of an important message. However, the vibration output may interfere with the audible audio output because the vibration output is generally not silent (i.e., an audio is generated by the LRA 160 as it vibrates). With the understanding that both audible audio and vibration outputs may be produced simultaneously, an explanation as to how each type of output may be produced is provided.

When it is determined, at 502, that an audible audio output (i.e., audible audio output or a HAC magnetic field) is to be generated, such as, without limitation, when a user requests playback of a song, or when a user receives a voice call, processing proceeds to 504 at which the processor 102 generates an audio signal based on the audio data in the audio source 402. The audio signal produced by the processor 102 is a digital signal, which is generally encoded using a known encoding scheme. Instructions for encoding the audio may be included in the audio instructions 410. In some embodiments (not shown), the audio is encoded in a specialized digital signal processor, which may be in the form of a separate component operating under control of or in cooperation with the processor 102. Alternatively, the digital signal processor may be included in the same chip at the processor 102, for example, using a system on a chip (SoC) architecture integrating the components into one integrated circuit.

Additionally, at 506 the processor 102 determines if the electronic device 100 is operating in a HAC mode, for example by determining the value of the HAC setting 414. When the HAC setting 414 indicates the device is operating in the HAC mode, the electronic device 100 produces a magnetic field suitable for inductively coupling the LRA 160 to a hearing aid (such as the hearing aid 300). Optionally, the processor 102 may at 508 disable the speaker 128 when the device 100 is operating in the HAC mode, as previously discussed. However, in some embodiments, the speaker 128 remains enabled, and the audio signal is sent to the speaker 128 because the speaker 128 may also produce a magnetic field suitable for inductively coupling to a hearing aid.

While operating in the HAC mode, the processor 102 enables filtering of the audio signal, for example, by routing the audio signal to a hardware DSP filter or by enabling a software DSP filter. The filter 420, under direct or indirect control of the processor 102, filters the audio signal at 510 to produce a filtered audio signal having attenuated frequency components corresponding to the vibration frequency range of the LRA 160. The drive circuit 162, under direct or indirect control of the processor 102, generates a drive signal at 512 to drive the LRA 160, using the filtered audio signal, to produce a magnetic field.

While, in this embodiment, the filtering of the audio signal is performed prior to generating the drive signal, it is noted that the order is not important. In an alternate embodiment, the drive signal may be generated first, and then the drive signal is filtered to attenuate the frequency components corresponding to the vibration frequency range of the LRA 160. In both embodiments, the signal received at the LRA 160 is a drive signal having attenuated frequency components corresponding to the vibration frequency range of the LRA 160 (referred to, hereinafter, as the filtered drive signal).

At 514, the filtered drive signal is sent to the LRA 160. When the LRA 160 receives the filtered drive signal corresponding to the filtered audio signal, the LRA 160 produces a magnetic field corresponding to the filtered audio signal while producing no vibrations (or only negligible vibrations). The produced magnetic field is operable to inductively couple the LRA 160 to a hearing aid (such as hearing aid 300).

When the HAC setting 414 indicates the device is not operating in the HAC mode (decision block 506), the electronic device 100 produces an audible audio output using the speaker 128. Since the filtering of the audio signal is no longer required, the processor 102 disables filtering at 516. The drive circuit 162 also generates a drive signal at 518 to drive the speaker 128 using the audio signal. At 520, the drive signal is sent to the speaker 128. When the speaker 128 receives the drive signal corresponding to the audio signal, the speaker 128 produces an audible audio output corresponding to the audio signal.

The filtering is designed to remove specific frequencies of the audio signal; however, since it is desirable to maintain the best dynamic range of the audio signal, in some embodiments, the filtering is only performed when the HAC mode is enabled, as determined at 506 (for example, based on the HAC setting 414).

When it is determined, at 502 that a vibration output is to be generated, such as, without limitation, to notify a user of an event or message, processing proceeds to 530. The processor 102 generates a vibration signal based on the vibration instructions 412. The vibration signal produced by the processor is a digital signal, thus a corresponding drive signal for driving the LRA 160 to vibrate is first generated. At 532, the processor 102 disables filtering, for example, by routing the vibration signal away from a hardware filter or by disabling a digital filter. The filter 420 is disabled for the LRA 160 to vibrate. The drive circuit 162, under direct or indirect control of the processor 102, generates a drive signal at 534 to drive the LRA 160, using the vibration signal, to vibrate.

At 536, the drive signal is sent to the LRA 160. When the LRA 160 receives the drive signal corresponding to the vibration signal, the LRA 160 produces a vibration.

Thus, by selective filtering, the electronic device 100 is able to repurpose the LRA 160, originally designed to generate vibrations for user notifications, and to generate magnetic fields suitable for inductively coupling the LRA 160 (and thus the electronic device 100) to a hearing aid, such as the hearing aid 300.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the described embodiments set forth in the examples, but should be given the broadest interpretation consistent with the description as a whole.

The invention claimed is:

1. An electronic device, comprising:
   a vibrator comprising a linear resonance actuator (LRA) including a movable magnetic mass, a spring biasing the movable magnetic mass, and a voice coil;
   a drive circuit coupled to the LRA and configured to generate a drive signal for driving the movable magnetic mass of the LRA; and
   a processor coupled to the LRA configured to:
      control the voice coil of the LRA to generate a magnetic field for inductively coupling the electronic device to a hearing aid when a hearing aid compatibility (HAC) mode is enabled, wherein the generated magnetic field is encoded with audio information which corresponds to an audio signal; and
      cause the drive circuit to generate the drive signal to cause the movable magnetic mass of the LRA to vibrate in a vibration frequency range of the movable magnetic mass.

2. The electronic device of claim 1, further comprising:
   a filter configured to attenuate a frequency component of the audio signal corresponding to a vibration frequency range of the movable magnetic mass of the LRA to generate a filtered audio signal when the HAC mode is enabled, wherein the generated magnetic field is encoded with audio information which corresponds to the filtered audio signal.

3. The electronic device of claim 2, wherein the vibration frequency range of the movable magnetic mass of the LRA is about 100 Hz to about 300 Hz.

4. The electronic device of claim 2, wherein the filtered audio signal and the magnetic field have a frequency range between a lower limit of about 100 to about 300 Hz and an upper limit of about 20,000 Hz.

5. The electronic device of claim 2, wherein the drive circuit is also coupled to the filter, wherein the drive signal generated by the drive circuit corresponds to the filtered audio signal.

6. The electronic device of claim 1, wherein the vibration frequency range of the movable magnetic mass of the LRA is about 100 Hz to about 300 Hz.

7. The electronic device of claim 2, further comprising:
   a speaker; and
   wherein the drive circuit is also coupled to the speaker, wherein the drive circuit is configured to generate a drive signal corresponding to the audio signal for driving the speaker to generate an audible audio output, and wherein the drive circuit is configured to generate a drive signal corresponding to the filtered audio signal for driving the LRA to generate the magnetic field when the HAC mode is enabled.

8. The electronic device of claim 7, wherein the vibration frequency range of the movable magnetic mass of the LRA is about 100 Hz to about 300 Hz.

9. The electronic device of claim 7, wherein the LRA is positioned proximate to the speaker.

10. A method, comprising:
    providing an electronic device comprising a vibrator, the vibrating a comprising a linear resonance actuator (LRA) comprising a movable magnetic mass, a spring biasing the movable magnetic mass, and a voice coil;
    when in a vibration mode, generating via a drive signal to cause the movable magnetic mass of the LRA to vibrate in a vibration frequency range of the movable magnetic mass; and
    when a hearing aid compatibility (HAC) mode is enabled, generating an audio signal and controlling the voice coil of the LRA to generate a magnetic field for inductively coupling to a hearing aid, wherein the magnetic field is encoded with audio information which corresponds to the audio signal.

11. The method of claim 10, further comprising:
    filtering the audio signal to attenuate a frequency component of the audio signal corresponding to a vibration frequency range of the movable magnetic mass of the LRA to generate a filtered audio signal when the HAC mode is enabled, generate a filtered audio signal, wherein the generated magnetic field is encoded with audio information which corresponds to the filtered audio signal.

12. The method of claim 11, wherein the vibration frequency range of the movable magnetic mass of the LRA is about 100 Hz to about 300 Hz.

13. The method of claim 11, wherein the filtered audio signal and the magnetic field have a frequency range between a lower limit of about 100 to about 300 Hz and an upper limit of about 20,000 Hz.

14. The method of claim 11, further comprising:
    generating a filtered drive signal corresponding to the filtered audio signal; and
    sending the filtered drive signal to the LRA to drive the LRA to generate the magnetic field.

15. The method of claim 14, wherein the filtered drive signal is configured such that the movable magnetic mass of the LRA does not vibrate.

16. The method of claim 10, further comprising disabling a speaker when the HAC mode is enabled.

17. The method of claim 10, further comprising sending the audio signal to a speaker when the HAC mode is disabled.

* * * * *